ABRAM DEHUFF.

Improvement in Releasing Apparatus for Stables.

No. 124,668. Patented March 19, 1872.

Witnesses.
C. H. Poole
Wm Thomson

Inventor.
Abram Dehuff 124,668

UNITED STATES PATENT OFFICE.

ABRAM DEHUFF, OF YORK, PENNSYLVANIA.

IMPROVEMENT IN RELEASING APPARATUS FOR STABLES.

Specification forming part of Letters Patent No. 124,668, dated March 19, 1872.

Specificaiton describing certain Improvements in Apparatus for Relieving Horses and Other Animals Fastened in Stables, Barns, &c., invented by ABRAM DEHUFF, of York, Pennsylvania.

My invention relates to an improved method of releasing animals from their fastenings, by which they can be let loose by the operation of a lever outside of the stalls or other inclosures, as hereinafter set forth.

Figure 1:
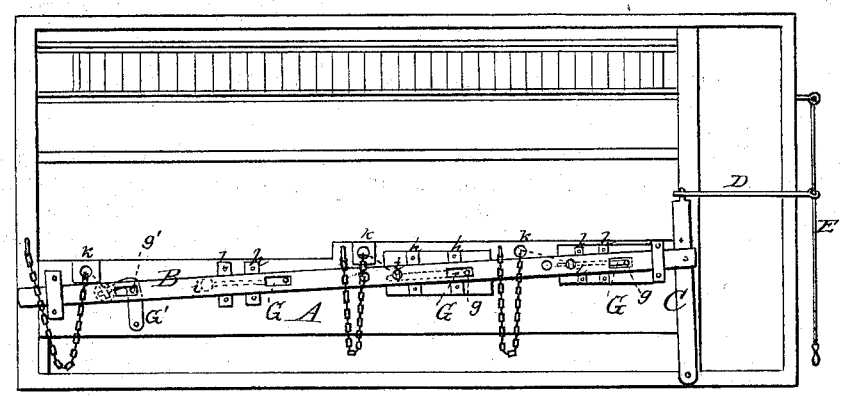
Figure 3:
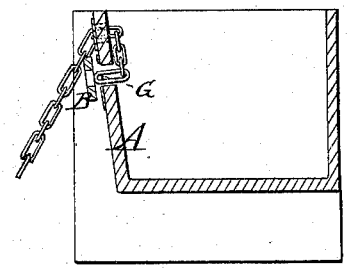
Figure 2:
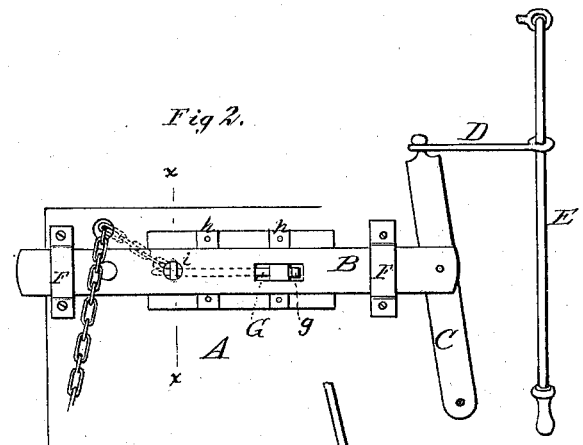
Figure 4:
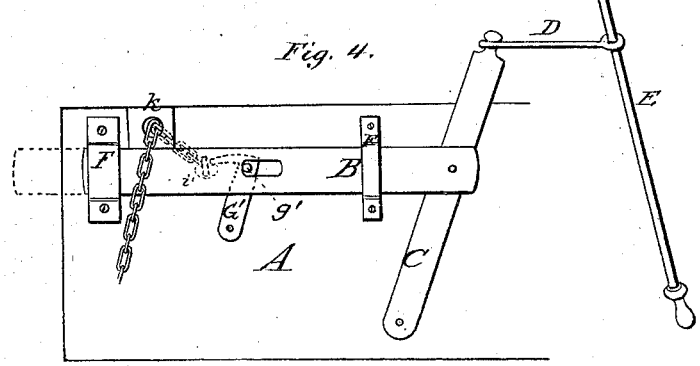

Figure 1 of the drawing is a front view of my device. Fig. 2 is an enlarged view of the same, showing fastening and releasing apparatus for a single animal. Fig. 3 is a section on line $x\,x$ of Fig. 2. Fig. 4 is a modified form of the same device.

A is the feed-trough; B, the sliding-bar; C, the operating-lever; D, the connecting-rod to the arm E for operating the lever. F F are the guides of the sliding bar B. G is the bolt which fastens the link at the end of the halter-chain. $g$ is the knob on the end of the bolt, moved by coming in contact with the end of the slot in which it plays; $h\,h$, the guides of the bolt G; $i$, the hole through which the link passes when it is to be fastened by the bolt G; and $k$, the hole in the front of the trough, out of which the halter-chain leads, to be attached to the animal. The sliding bar B is a flat bar of strap-iron extending along the front of the trough provided with slots, within which slides the knob $g$ of the bolt G. It acts as a protection to the bolts by preventing any interference with them by the animals. The slots are made several inches in length, in order that when any single animal is to be released the bolt may be withdrawn and the halter-chain let loose by hand, without moving the lever C, by means of the arm E which releases them all at once. The connecting-rod D extends across a passage which leads to the feed-room, and is designed to be so lengthened as to reach to the outside of the stable, and so arranged as to be high enough for a person to pass under it. The halter-chain passes through the hole $k$, and thence the link is inserted into the bolt-hole $i$, for the purpose of obviating an undue strain on the bolt, which otherwise might not be so readily withdrawn.

I do not claim broadly the sliding slotted bar for operating the bolts, as I am aware that such device is not new; but

What I claim as my invention is—

1. In combination with the sliding slotted bar B and bolts $G$, the lever C, link D, and outside lever E, substantially as and for the purpose specified.

2. In combination with the bolts G and slididg slotted bar B, the holes $k\,i$, arranged as end for the purpose specified.

ABRAM DEHUFF.

Witnesses:
C. H. POOLE,
R. M. THOMSON.